United States Patent Office

3,524,665
Patented Aug. 18, 1970

3,524,665
SHAFT COUPLING
Alfred Hohn, Nussbaumen, and Max Zimmermann, Untersiggenthal, Switzerland, assignors to Aktiengesellschaft Brown, Boveri & Cie, Baden, Switzerland, a joint-stock company
Filed Jan. 2, 1968, Ser. No. 695,125
Claims priority, application Switzerland, Apr. 18, 1967, 5,499/67
Int. Cl. F16d *1/00*
U.S. Cl. 287—113          3 Claims

ABSTRACT OF THE DISCLOSURE

A coupling for interconnecting the flanges provided on the ends of two axially aligned solid shafts for transmission of high torques principally by frictional contact established between the adjoining faces of the flanged shaft ends comprises a flanged coupling sleeve which when hot is inserted over the flanges and then allowed to cool. Shrinking stresses are set up in the sleeve during cooling and these stresses result in the application of axially directed forces from the sleeve flange to the flanges on the shaft ends which press them together.

---

Figure 1:
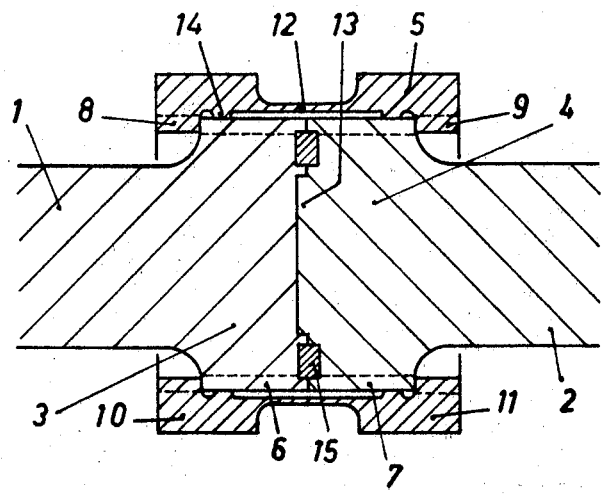

This invention relates to an improvement in a coupling arrangement for connecting two rotary solid shaft ends which are rigidly connected by means of coupling flanges at the ends of the shafts, for the transmission of great torques principally by friction contact between the end faces of the two coupling flanges produced by axial pressure forces.

Couplings of the flange type are used in the construction of large machines where the axial pressure forces must be great for two reasons: it should be possible to transmit a possibly high torque and if the coupling part is stressed for some reason additionally by alternating bending moments, there must be sufficient certainty that the two coupling flanges do not rupture. In the known constructions of this type, the pressure forces are produced by screws whose cross section must be sufficiently dimensioned to establish the necessary friction contact for transmission of the torque. The accommodation of the screws requires a large difference in the diameters between the shaft ends and the coupling flange. Frequently the difficulty is encountered that the outer diameter of the coupling flange cannot be selected at random, because, for example, a one-part structural element, which must not be increased, such as the cap-plate of a generator to be coupled, which must be pushed over the coupling flange. Moreover, when the torque to be transmitted increases, the shaft diameter increases likewise, so that the accommodation of the necessary screw cross sections is rendered very difficult, if not impossible.

The principal object of the invention is to provide a coupling for solid shafts utilizing integral flanges on the ends of the shaft and wherein the outer diameter of the coupling flanges is not appreciably larger than that of the solid shaft itself and wherein such high axial pressure forces can be produced that they are capable of transmitting great torques principally by frictional forces developed between the abutting end faces of the flanged shaft ends. Besides, the shaft coupling should be well centered. This is achieved according to the invention by a flange sleeve extending over both coupling flanges at the shaft ends and positively coupled with them, which produces the necessary pressure-forces by shrinking stresses.

The invention will be described more fully below in several embodiments which are represented in the drawing in an axial section. In all figures, the corresponding parts are designated with the same reference numbers.

Figure 2:
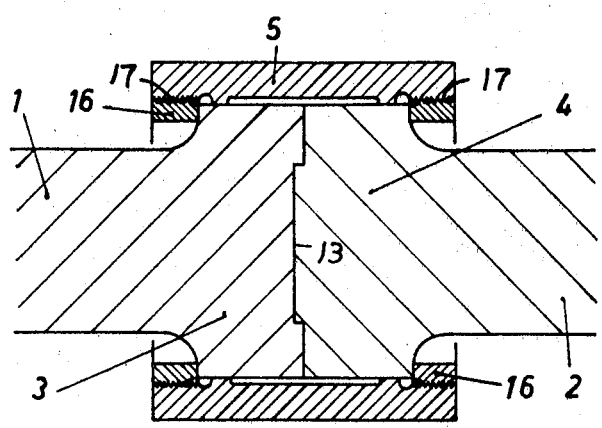
Figure 3:
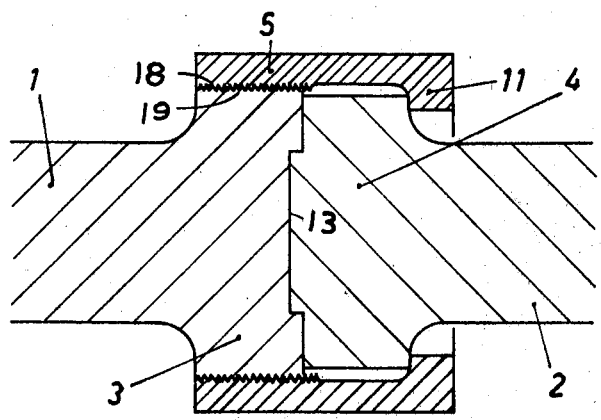

FIG. 1 illustrates an embodiment of the invention wherein inwardly flanged end portions of the sleeve transmit the desired axial forces in the direction of the junction between the shaft flanges by application of forces directly against the faces of the shaft flanges;

FIG. 2 illustrates a modified construction wherein the axial forces are transmitted from the sleeve to the shaft flanges by intermediate rings, these rings being provided with male threads which are screwed into female threads provided on the sleeve, these rings thus constituting the inwardly directed flanges on the sleeve; and FIG. 3 illustrates another modification wherein one of the shaft flanges is provided with a male thread which is screwed into a female thread provided at one end of the coupling sleeve, the other end of the sleeve including an inwardly projecting flange portion which engages the face of the other shaft flange.

In all embodiments the ends of the solid shaft 1, 2 to be coupled are provided with integral coupling flange portions 3, 4 which are engaged by sleeve 5. For the production of the necessary positive coupling, the sleeve is heated so that it expands by a desired amount and then each end is connected with one of the two coupling flanges which are in close contact at their end faces with the shafts close together. When the sleeve cools off, axially acting shrinking stresses appear therein, since it cannot contract, which serve to press the coupling flanges axially against each other.

According to FIG. 1, longitudinal groove-like recesses 6, 7 are provided on the outer circumference of the coupling flanges 3, 4 to establish longitudinal ribs therebetween which coincide with similar recesses 8, 9 in the radially inward flanged parts 10, 11 of sleeve 5 in such a way that the sleeve can be pushed over the flanges. The length of the sleeve is so dimensioned that the inwardly directed flange parts 10, 11 just embrace the two shaft flanges in the heated state. In this manner it is possible to turn the sleeve so far that the ribs remaining in circumferential direction between the recesses 6, 7 and 8, 9 oppose each other similar to a bayonet catch while the sleeve is hot, thus transmitting the axial pressure forces from the sleeve to the shaft flanges. Since these forces can become very great, it is advisable to make the central portion 12 of the sleeve elastic, for example, by effecting a large reduction of the cross sectional area as compared with the remaining cross section at the ends 10, 11.

For centering the two shaft ends there is provided on the end face of coupling flange 4 a centering boss 13 which fits into a corresponding recess in the end face of coupling flanges 3. The centering of sleeve 5 on flanges 3, 4 can be effected by ring shaped ribs 14, for which a shrinkage of suitable extent can likewise be used.

The coupling according to the invention can be designed as a purely friction coupling or it can be combined with shear stress elements. Suitable for this purpose are, for example, cylindrical wedge pieces 15 which are distributed over a circular line, and inserted in recesses at the adjoining end faces of the two coupling flanges 3, 4 at a location radially outward of the centering boss 13.

The possibility of transmitting the axial pressure forces from the sleeve to the coupling flanges by intermediate elements is represented in FIG. 2. Female threads 17 are provided at both ends of sleeve 5. Into the hot sleeve 5 pushed over the flanges 3, 4 male threaded rings 16 are screwed in from both sides. The threaded rings 16 can be axially divided for easier assembly. These rings which thus constitute the inwardly directed flanges on the sleeve bear against the faces of shaft end flanges 3 and 4. During the cooling of the sleeve, the threaded rings press the flanges together. As force-transmitting intermediate pieces can be used, for example, wedges.

Another embodiment is shown in FIG. 3. One end of sleeve 5 is provided with a female thread 18 which screws onto a thread 19 on the outer circumference of flange 3. The other end of sleeve 5 is provided with flange part 11 which is directed radially inward to engage shaft end flange 4. The hot sleeve 5 is screwed onto shaft end flange 3 until the flange part 11 bears against the face of shaft end flange 4. When the sleeve cools off, the desired axial pressure forces between the abutting end faces of the shafts appear. It would also be possible to provide a right-hand and a left-hand thread in the sleeve, and the corresponding opposite hand threads on the flanges, and to tighten in this manner the two flanges with the hot sleeve.

The coupling flanges are preferably made integral with the shaft ends, but they can also be manufactured as separate parts and connected rigidly with the shaft ends in any expedient manner. It is also possible to make the sleeve of two or more parts.

The coupling according to the invention permits the accommodation of a multiple cross sectional area, compared to a screw construction, of the coupling part producing the axial forces pressure with a substantially smaller outside diameter of the coupling flanges, which can be reduced to 1.2 times the shaft diameter. Since the flanges need not be bored through and the coupling connection, namely the sleeve, is cylinder-symmetrical, its stress is low. The coupling is therefore suitable not only for the transmission of great torques, but it can also be used at high shaft speeds.

We claim:
1. A coupling for and connecting together the flanged ends of two axially aligned solid shafts for transmission of high torques comprising a coupling sleeve having radially inwardly extending end flanges which embrace the end flanges on said shafts, said sleeve being united when hot with said shaft end flanges and being thereafter axially shrunk onto said shaft end flanges such that the shrinking stresses result in the application of axially directed forces from said sleeve flanges which press said shaft end flanges and the abutting end faces of said solid shafts into a high degree of frictional contact capable of transmitting high torques applied to said coupled shafts, and shear elements interposed in aligned recesses in the adjoining end faces of said shaft ends for supplemental transmission of the torque between said shafts.

2. A coupling for and connecting together the flanged ends of two axially aligned solid shafts for transmission of high torques comprising a coupling sleeve having radially inwardly extending end flanges which embrace the end flanges on said shafts, said end flanges on said sleeve and the circumferential surfaces of said shaft end flanges being grooved longitudinally to enable said sleeve to first be pushed longitudinally over said shaft end flanges, and to thereafter be turned to bring the end faces of the ribs formed between the grooves in said sleeve flanges into contact with the end faces of the ribs formed between the grooves in the circumferential surface of said shaft end flanges, said sleeve being united when hot with said shaft end flanges and being thereafter axially shrunk onto said shaft end flanges such that the shrinking stresses result in the application of axially directed forces from the ribs on said sleeve flanges which press the ribs on said shaft end flanges and the abutting end faces of said solid shafts into a high degree of frictional contact capable of transmitting high torques applied to said coupled shafts.

3. A shaft coupling as defined in claim 2 and wherein the central portion of said sleeve is reduced in diameter to establish a comparatively thinner wall section having an elastic characteristic.

References Cited

UNITED STATES PATENTS

| 750,565 | 1/1904 | Austin. | |
|---|---|---|---|
| 1,772,174 | 8/1930 | Anderson | 287—113 |
| 1,910,563 | 5/1933 | Porter | 287—113 |
| 2,984,899 | 5/1961 | Richter et al. | 29—447 |

FOREIGN PATENTS

| 44,334 | 8/1888 | Germany. |
|---|---|---|
| 372,153 | 3/1923 | Germany. |
| 631,543 | 11/1949 | Great Britain. |

DAVID J. WILLIAMOWSKY, Primary Examiner

A. V. KUNDRAT, Assistant Examiner

U.S. Cl. X.R.

287—130